Feb. 13, 1962
S. W. ALDERFER ETAL
3,020,587
PROCESS AND APPARATUS FOR THE MANUFACTURE
OF SEALING STRIPS OR GASKETS
Filed April 3, 1958
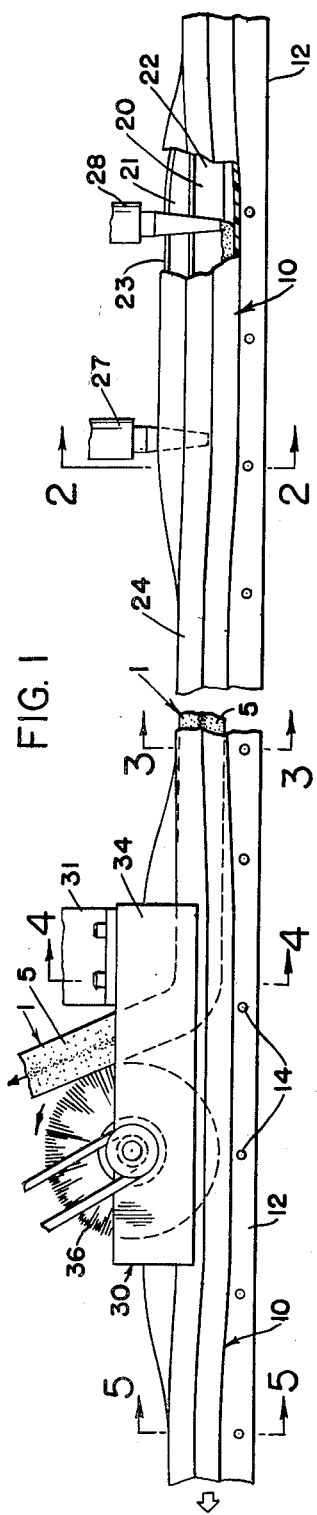
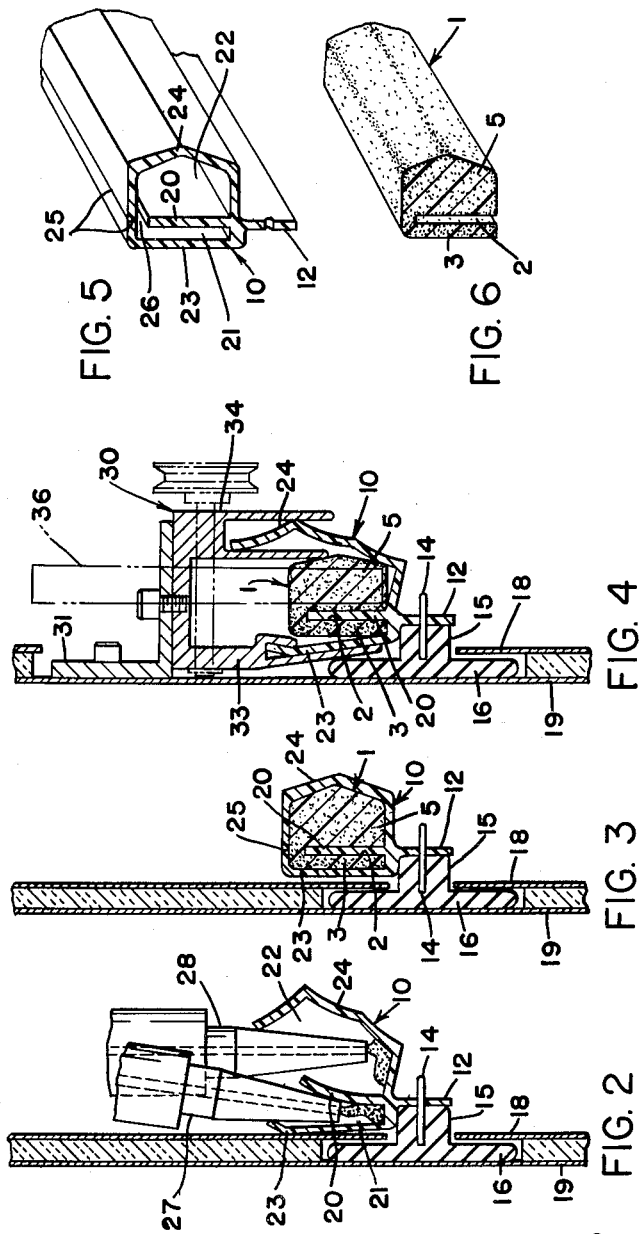
INVENTORS
STERLING W. ALDERFER &
HARRY D. BODLEY
BY
Ely, Frye & Hamilton
ATTORNEYS

United States Patent Office 3,020,587
Patented Feb. 13, 1962

3,020,587
PROCESS AND APPARATUS FOR THE MANUFACTURE OF SEALING STRIPS OR GASKETS
Sterling W. Alderfer and Harry David Bodley, Akron, Ohio, assignors to Sterling Alderfer Company, Akron, Ohio, a corporation of Ohio
Filed Apr. 3, 1958, Ser. No. 726,122
7 Claims. (Cl. 18—4)

The present invention relates to the manufacture of sealing strips or gaskets such as used on refrigerator doors or for holding the edges of the glass of an automobile windshield or window. There are many other uses to which the product of this invention may be put.

In the drawings and in the more specific parts of the description to follow, particular reference is made to the manufacture of refrigerator door sealing strips, but the invention is not to be so limited.

Strips or gaskets of the type referred to herein are characterized by the presence of two lobes or portions separated by a channel which usually fits over a web or flange on the door or framework to which the article is to be attached. One portion of the strip bears against the web or flange and, by exerting pressure thereon, holds the strip in place. The other portion of the strip is designed to make the sealing contact when the refrigerator door is closed.

The new form of sealing strip shown herein differs from known forms in that that portion of the strip, the primary function of which is to hold the strip in place, is firmer and of greater density than the other portion of the strip, which is softer and more yielding so as to make a better seal.

The present invention relates to a method and machine by which a composite and unitary gasket or sealing strip may be economically produced and which will give the desirable attributes to the finished product.

In its preferred form, the article is made of foamed resins such, for example, as commonly known as polyurethane foam, but other materials now in existence or later to be developed may be used. In its preferred form both lobes or portions of the strip are made from foamed resins although it is possible that the denser section of the strip be made of a solid body which is compatible with the cushion portion.

In the drawings and description, the preferred embodiment of the invention is given but it will be understood that specific details are not important and may be varied within the scope of the invention as set forth in the claims.

In the drawings:

FIG. 1 is a composite view in which the various steps of the process and various parts of the apparatus are shown.

FIG. 2 is a cross section on the line 2—2 of FIG. 1 showing the manner in which the two portions of the strip are formed.

FIG. 3 is a cross section on the line 3—3 of FIG. 1 showing the moving mold after the reaction has been completed.

FIG. 4 is a section on the line 4—4 of FIG. 1 showing the mold spread to release the finished strip.

FIG. 5 is a cross section of the mold when empty, this view being taken on the line 5—5 of FIG. 1.

FIG. 6 is a cross sectional view of the finished product.

As has been indicated above, the material which it is preferred to use to make the composite gasket or sealing strip is a polyurethane foam which is made by well-known chemical reactions. It will be specifically understood, however, that while this material is preferred, equivalent synthetic resins capable of being foamed and which will produce flexible products having the desired properties are not to be excluded from the scope of the claims.

Polyurethane foams are cellular materials prepared by the reaction of polyisocyanates, polyesters and water in the presence of a catalyst which causes the reaction to take place in a very few minutes. The polyurethane foams are particularly desirable for the purpose because the foaming and curing which takes place is exothermic and hence the material is self-curing, and, as the two separate bodies of foam come in contact while the foaming operation is proceeding, the heat of the reaction will cause the bodies to unite in an inseparable fused bond. Other foaming materials which require the addition of external heat are less desirable but are not to be excluded from the scope of the claims.

It is possible also, with polyurethane foams, to vary the density and flexibility of the resultant foam by changing the proportion of water in the original mix, the greater the proportion of water the less dense and more easily compressible is the product.

In FIG. 6 is shown an exemplary form of sealing strip which is designed and adapted to be used about a refrigerator door. The strip is given the reference numeral 1. It is provided with a channel 2 extending from one side of the strip over its whole length and which is intended to be passed over the flange or web on the door frame. The flange or web of the frame fits snugly in the channel and may be slightly thicker than the cross section of the channel.

The numeral 3 indicates that portion of the sealing strip which may be termed the base or retaining edge and is denser, the purpose of which is to grip the web or flange more firmly. The section 5 is softer and has greater cushioning properties so that the door will be more securely sealed.

In order to achieve the objects of the invention problems are presented in the production of a two-phase or composite strip to insure that the two portions of the strip will be compatible, so as to unite in a fused bond at the junction of the parts 3 and 5 while the foaming reactions are going on concurrently. First of these is the necessity of achieving a rate of blowing and gelation of foam materials at a rate of speed that is similar, though not of necessity at an identical rate. Second, is the compatibility of the impinging surfaces as they come together during the foaming or blowing phase. In other words, there must be no collapse or undue shrinkage as the foaming materials meet and blend together.

A combination of two foams of different densities which will give no problems or difficulties of combining might be used as follows: For the base or retaining edge 3 a foam of an ethylated adipic acid ester-type with very high tensile and elongation and low compression set is made thus:

| | Parts by weight |
|---|---|
| Polyester resin | 100.00 |
| Emulsifier (Witco 77–86) | 2.25 |
| Water | 2.50 |
| N-methyl morpholine | 1.75 |
| Isocyanate (65–35 blend of 2–4 and 2–6 isomers of tolylene diisocyanate) | 30.00 |

The lower density companion foam forming the actual sealing or cushioning surface 5 would be:

| | Parts by weight |
|---|---|
| Polyester resin | 100.00 |
| Emulsifier (Witco 77–86) | 2.75 |
| Water | 3.40 |
| N-methyl morpholine | 2.75 |
| Isocyanate (80–20 blend of 2–4 and 2–6 isomers of tolylene diisocyanate) | 40.00 |

The first formulation will give a density of 3.8 to 4.0 pounds per cubic foot. The second would produce a density of 2.2 to 2.4 pounds per cubic foot.

These two materials, although using different isocyanates, will combine with no trouble from collapse or shrinkage. The higher density foam with high elongation and tensile properties would enable easy stripping of the cured foam from the foaming tube or mold.

The use of polyether type foams is not generally indicated due to the low tensile and tear resistance of most ether-type foams. A highly reacted prepolymer, made in a formulation similar to the semi-rigid crash pad materials in use and made of ether-type resins, may be used as a base or retaining edge and combined with a resilient ether-type foam as a sealing or cushioning edge. The semi-rigid base will provide the tensile strength and tear resistance necessary for removal from tube or mold. Post-cure crushing of foam to break closed cells is necessary.

The combination of an ester-type foam as base or retaining edge with a low density ether-type foam sealing or cushioning edge would require use of the silicone needed in the ether-type foam. This would minimize the possibility of collapse of the ester-type foam by silicone fluid. A base or retaining edge using the formula shown previously would be ideal. For a sealing or cushioning edge, the following may be used:

|  | Parts by weight |
|---|---|
| Ether-type resin | 100.00 |
| Isocyanate (80–20 blend of 2–4 and 2–6 isomers of tolylene diisocyanates) | 33.80 |

This is made into a prepolymer by customary methods. Then, immediately before use, 100 parts by weight of this prepolymer is mixed with 0.4 part of DC200 (50 cstks) silicone. This is combined with a catalyst mix made as follows:

|  | Parts by weight |
|---|---|
| Water | 2.3 |
| N-methyl morpholine | 1.0 |
| Triethylamine | 0.2 |

Crushing of the ether-type foam would be necessary to prevent post-cure shrinkage.

The sealing gasket may be of uniform cross-sectional area throughout or, as is sometimes desirable, areas thereof may be increased or diminished to fit specific requirements. In cases where a certain cross-sectional area differs from the cross sectional area of the remainder of the strip, the mold is enlarged or diminished and will be slowed down or accelerated at these points while the rate of feed of the mix is constant, or the rate of discharge of the mix will be increased or diminished without varying the speed of the mold. In the drawings the cross-sectional area of the cavity within the traveling mold is shown as constant.

There is provided a moving or running mold or casing which is indicated as a whole by the numeral 10. This may be formed of a diversity of materials which are flexible and yet have sufficient rigidity to hold the charge of foaming material and to withstand the temperature which is either generated by the reaction or which may be applied from the exterior. The material of the mold must be such that it will part cleanly from the product, and will not be affected by the reaction. The preferred form of the invention uses a polyurethane foam or foams as there is no necessity for applying extraneous heat. In the case of a foaming material which requires the addition of heat, an oven (not shown) will be provided along a portion of the travel of the mold and the material of the mold will be selected to be not deleteriously affected by the applied heat or polypropylene.

In the preferred form of the invention, the mold is made of one of the several forms of polyethylene or polypropylene which are available, the walls which enclose the molding cavity being approximately 1/16" thick to provide the essential rigidity and yet be sufficiently flexible to be capable of spreading apart to permit the entry of filling nozzles and for the withdrawal of the finished product, and thereafter to close together.

Another substitute for the polyethylene is the material known as Teflon, which is the trade name for a tetrafluoroethylene polymer manufactured by E. I. du Pont de Nemours Co. Other materials may be suitable.

The mold is a long endless belt and is provided with a flange or web 12 by which the mold is supported and propelled by impaling it on pins 14 which project from a rib 15 attached to or forming a part of an endless belt 16. The belt 16 is driven by any suitable power means (not shown) and is supported and guided in a channel 18 carried by a framework 19. Other means for supporting and driving the belt and for attaching the mold thereto may be employed. It is desirable to provide a simple means of attaching the mold to the driving mechanism so as to allow for quick and easy substitution of other molds.

Extending upwardly from the web 12 is the mold proper, which is integrally formed with the web and is divided by the partition wall 20 into the two compartments or chambers 21 and 22 which form the parts 3 and 5, respectively, of the finished gasket and are connected by a passage 26, here shown as above the top of the partition. The outer walls 23 and 24 are shaped as shown and meet at the parting line 25. The elastic properties of the polyethylene casing or mold are such that the two edges of the walls will be brought together after loading the mold and will close off the mold area but will allow the escape of air or gases through the crack between the walls as the mold fills, but will not allow the foaming material to escape.

The compartment 22 is shown as larger than the compartment 21, this being to create a gasket with a large cushioning body. To supply the mix in its unfoamed state, two nozzles 27 and 28 are located over the traveling mold and project through the crack 25 into the respective compartments 21 and 22, the nozzle 27 in this case containing the material for making the denser foam and the nozzle 28 the lighter material. The nozzles serve to spread the mold apart and the rate of flow is graduated for both so that the mixes, when the foaming operation subsides, will completely fill the respective cavities and flow together over the partition wall where they will unite to form a composite gasket with the denser foam in the chamber 21 and the lighter foam in the chamber 22.

After leaving the nozzles, the mold or casing closes while the reaction proceeds.

To remove the finished product at some later point in the mold travel, there is provided an overhead spreader which is indicated as a whole at 30. The spreader is carried by brackets 31 attached to the framework 19 and to the upper central portion of the spreader. From the central portion of the spreader extend the two parallel bifurcated arms 33 and 34, each of which forms a channel to receive and bend outwardly one wall of the mold, and thus strip it from the sides of the product. The channel 33 is designed to receive and hold the wall 23 while the channel 34 receives and holds the wall 24.

The finished product may be lifted or pulled out of the mold by any suitable means. For example, a wire brush 36 may be located so that it projects into the path of the product and is rotated in the direction shown by the arrow in FIG. 1, to lift the product out of the channel and deliver it to any suitable off-bearing means.

There has been provided a new method and apparatus whereby a gasket or like product having two lobes or sections may be rapidly and economically produced from any of the well-known foaming materials which will expand and fill the mold so that the gasket takes the form of the mold.

While the invention has been particularly described for making gaskets or strips of material having two portions or sections of different densities or other characteristics, which are inseparably united by a fused bond, the process and apparatus is suitable for making a strip of material divided by a channel and in which both sections of the strip are of the same properties or characteristics. It is also possible to remove the partition wall 20 and have a gasket without a central channel but with two unlike parts. As a further variation of the basic method, the passage or passages in the partition wall may be discontinuous or may be located at any point in the partition. The invention may also be employed to make strips with more than two sections or lobes.

In broader aspects of the invention it is possible to make the composite strip of materials of differing hardnesses, either one or both of which may be compounded so it will not foam and permitting the setting or curing reactions to proceed so that the two bodies will unite and fuse together in the region of the channel 2. This may be done by using a non-foaming compound in either chamber of the running mold.

In using this form of the invention as a sealing gasket, the non-foaming constituent should preferably be admitted to the chamber 21 in order to have the firmer portion of the strip for holding the strip in place.

In carrying out a modification of the invention in which the portion 3 of the strip is a solid urethane and in which the portion 2 is a foamed urethane, or in using other materials, the compatibility of the components will be an element to consider in arriving at proper formulations.

In making a compound strip in which the section 2 is a foamed material, such material will foam and gel at a temperature between 130° F. and 150° F., while the solid part or that forming the portion 3 will gel and cure at 175° F. to 250° F. The compound which is to form the part 3 will be fed into the mixer at approximately 130° F. in order to accelerate the gelling of the material. At the same time the foaming compound which forms the section 2 should be kept in the mixer at 75° to 95° F. in order to control the foaming rate.

When the essentials have been pointed out, as has been done, the details in the carrying out of this phase of the invention are within the skill of one familiar with the compounding of resins.

Any conventional materials used for flexible, semirigid or urethane foams may be used on the cushion side of the strip and materials commonly used as casting resins for urethane coatings, potting and encapsuling compounds or molded articles could be used for the solid portion. Examples of the formulations for the solid portions are given:

(1)

| | Parts |
|---|---|
| Polyester resin-isocyanate prepolymer | 100.0 |
| Ethanolamine | 2.2 |

Mixing temperature—130° F.

(2)

| | Parts |
|---|---|
| Polyester resin-isocyanate prepolymer | 100.0 |
| 3,3' dichlorobenzidene | 9.4 |

Mixing temperature—140° F.

Resins of the polyether type might also be reacted with isocyanates to make such casting compounds and give properties that would be desirable in a solid and foamed urethane combination.

Other modifications and improvements will appear to those skilled in this art and it is intended that the claims herein are to be construed to cover all such modifications and not to be limited to exact conformity with the details which have been set out herein.

What is claimed is:

1. Apparatus for the manufacture of composite, unitary strips of flexible material, comprising, an elongated flexible mold having exterior walls defining a mold cavity, said cavity being divided by a partition extending upwardly from the bottom wall of said mold to define two chambers, said partition terminating below the upper wall of said mold a distance sufficient to provide a passage between said chambers, said upper wall having a longitudinal parting line above said partition, two charging nozzles projecting into said cavity along said parting line, one nozzle being adapted to discharge unfoamed foaming material into one of said chambers, the other nozzle being adapted to discharge unfoamed foaming material into the other of said chambers, means to spread the walls of said mold along said parting line after the molding operation to permit removal of said finished strip, and means to support and propel the mold past the nozzles and through the spreading means.

2. Apparatus for the manufacture of strips of flexible material, comprising, an elongated flexible mold having exterior walls defining a mold cavity, said mold having means dividing said cavity into at least two separate chambers communicating at their upper portions, said mold having a longitudinal parting line above said dividing means, at least two nozzles projecting into said cavity along said parting line, each said nozzle being adapted to deposit liquid molding material into one of said chambers, and means to support and propel the mold.

3. Apparatus for the manufacture of strips of flexible material, comprising, an elongated flexible mold having exterior walls defining a mold cavity, said mold having means dividing said cavity into at least two separate chambers communicating at their upper portions, said mold having a longitudinal parting line above said dividing means, at least two nozzles projecting into said cavity along said parting line, each said nozzle being adapted to deposit liquid molding material into one of said chambers, means to support and propel the mold, means projecting into the cavity along said parting line for spreading the mold and permitting removal of the finished product, and means to allow air and gases to escape from the cavity.

4. Apparatus for the manufacture of flexible strips of polyurethane having two separate lobes, comprising, an elongated flexible mold having exterior walls defining a mold cavity, said cavity being divided by a partition extending upwardly from the bottom wall of said mold to define two chambers, said partition terminating below the upper wall of said mold a distance sufficient to provide a passage between said chambers, said upper wall having a longitudinal parting line above said partition, two charging nozzles projecting into said cavity along said parting line, one nozzle being adapted to discharge unfoamed foaming liquid polyurethane into one of said chambers, the other nozzle being adapted to discharge unfoamed foaming liquid polyurethane into the other of said chambers, means to spread the walls of said mold along said parting line after the molding operation to permit removal of said finished strip, and means to support and propel the mold past the nozzles and through the spreading means.

5. The method of manufacturing a flexible resilient strip having two separate lobes in a continuous mold, comprising, moving a mold beneath two supply nozzles, said mold having exterior walls defining a mold cavity divided by partition means into two separate chambers communicating at their upper portions and a longitudinal parting line above the partition means, each supply nozzle extending into said mold cavity along said parting line and registering one in each chamber, injecting through each nozzle a stream of liquid resinous material which when set will fill the cavity and directing said streams to be deposited on opposite sides of the partition means, the liquid in at least one of said streams being a foaming material which will foam and fill the chamber in which it is deposited and join above the partition means in a fused bond with the material of the other stream.

6. The method of manufacturing a strip of flexible material having two sections of different densities in a continuous mold, comprising, moving a mold beneath two supply nozzles, said mold having exterior walls defining a mold cavity divided by partition means into two separate chambers communicating at their upper portions and a longitudinal parting line above the partition means, spreading the mold along the parting line so that each nozzle extends into said cavity and registers one in each chamber, injecting through each nozzle a stream of unfoamed foaming liquid resinous material and directing said streams to be deposited on opposite sides of the partition means, one of said streams being composed of material compounded to produce a foam of different density than the other stream, and uniting said materials in a fused bond above the partition means.

7. The method of manufacturing a flexible strip of polyurethane having two sections of different densities in a continuous mold, comprising, moving a mold beneath two supply nozzles, said mold having exterior walls defining a mold cavity divided by partition means into two separate chambers communicating at their upper portions and a longitudinal parting line above the partition means, spreading the mold along the parting line so that each nozzle extends into said cavity and registers one in each chamber, injecting through each nozzle a stream of unfoamed foaming liquid polyurethane and directing said streams to be deposited on opposite sides of the partition means, one of said streams being composed of a liquid polyurethane compounded to produce a foam of lesser density than the other stream, and uniting said liquids during foaming in a fused bond above the partition means.

References Cited in the file of this patent

UNITED STATES PATENTS

| | | |
|---|---|---|
| 2,141,405 | Randall | Dec. 27, 1938 |
| 2,150,287 | Minor | Mar. 14, 1939 |
| 2,228,721 | Edmonson | Jan. 14, 1941 |
| 2,315,366 | Daley et al. | Mar. 30, 1943 |
| 2,488,446 | Swiss | Nov. 15, 1949 |
| 2,586,275 | Toulmin | Feb. 19, 1952 |
| 2,668,987 | Harris et al. | Feb. 16, 1954 |
| 2,764,565 | Hoppe et al. | Sept. 25, 1956 |